United States Patent [19]
Suhara et al.

[11] Patent Number: 6,072,691
[45] Date of Patent: Jun. 6, 2000

[54] ELECTRIC DOUBLE LAYER CAPACITOR AND AN ASSEMBLED CELL TYPE POWER SOURCE DEVICE

[75] Inventors: Manabu Suhara; Kazuya Hiratsuka; Takeshi Kawasato; Manabu Tsushima, all of Yokohama, Japan

[73] Assignee: Asahi Glass Company Ltd., Tokyo, Japan

[21] Appl. No.: 08/991,777

[22] Filed: Dec. 16, 1997

[30] Foreign Application Priority Data

Dec. 20, 1996 [JP] Japan ................................ 8-355191
Jan. 17, 1997 [JP] Japan ................................ 9-020124

[51] Int. Cl.⁷ ........................... H01G 9/155; H01G 9/008
[52] U.S. Cl. ......................... 361/502; 361/522; 361/503; 307/109
[58] Field of Search .................... 361/502, 520, 361/328, 280, 500, 503, 516, 522; 307/109

[56] References Cited

U.S. PATENT DOCUMENTS

| | | | |
|---|---|---|---|
| 4,171,507 | 10/1979 | Joyees | 318/345 |
| 4,333,046 | 6/1982 | Lee | 323/231 |
| 4,725,926 | 2/1988 | Morimoto et al. | |
| 4,731,705 | 3/1988 | Velasco et al. | 361/433 |
| 4,757,424 | 7/1988 | Morimoto et al. | |
| 4,826,328 | 5/1989 | Sumal | |
| 4,922,161 | 5/1990 | Gilliland et al. | 318/269 |
| 4,975,796 | 12/1990 | MacDougall | 361/16 |
| 5,260,855 | 11/1993 | Kaschmitter et al. | 361/502 |
| 5,402,056 | 3/1995 | Ketterling | 320/6 |
| 5,545,933 | 8/1996 | Okamura et al. | |
| 5,604,426 | 2/1997 | Okamura et al. | |
| 5,867,363 | 2/1999 | Tsai et al. | 361/502 |

OTHER PUBLICATIONS

Patent Abstracts of Japan, vol. 095, No. 001, Feb. 28, 1995, JP 06 302474, Oct. 28, 1994.

*Primary Examiner*—Kristine Kincaid
*Assistant Examiner*—Eric Thomas
*Attorney, Agent, or Firm*—Oblon, Spivak, McClelland, Maier & Neustadt, P.C.

[57] ABSTRACT

An electric double layer capacitor used as a unit capacitor for forming an assembled cell type power source device by connecting a plurality of capacitor elements in series, wherein each of the capacitor elements is formed by impregnating an electrolyte in at least one pair of polarization electrode sheets between which a separator is inserted, wherein a protective circuit in which a Zener diode each having an operation resistance of 10–150 Ω at the average operation voltage of the electric double layer capacitor are connected in parallel to each of the electric double layer capacitors.

17 Claims, 4 Drawing Sheets

6,072,691

ELECTRIC DOUBLE LAYER CAPACITOR AND AN ASSEMBLED CELL TYPE POWER SOURCE DEVICE

BACKGROUND OF THE INVENTION

1. Field of the Invention

The present invention relates to an electric double layer capacitor having a large capacity used for power devices or electronic circuits. In particularly, the present invention relates to an electric double layer capacitor used as a unit capacitor for forming an assembled cell structure by connecting a plurality of unit capacitors in series by means of outer lead wires and an assembled cell type power source device for outputting a voltage of 8 V or more, which is formed by connecting a plurality of the unit capacitors in series.

2. Description of the Related Art

From the standpoint of utilizing effectively energy, electric double layer capacitors having a large capacity for power devices have widely been applied to, for example, a hybrid automobile mounting thereon a power source system constituted by a gasoline engine/electric double layer capacitor, an electric automobile, a power source system of a solar cell/electric double layer capacitor. Further, needs for a power source for electronic devices using the electric double layer capacitor has also been increasing. As the electric double layer capacitor having a large capacity for power devices, there have been developed one which employs an aqueous solution type electrolyte and one which employs an organic solvent type electrolyte. Since the electric double layer capacitor of low resistance and large capacity which employs an organic electrolyte can increase the working voltage, it can increase energy density in comparison with the electric double layer capacitor employing an aqueous solution type electrolyte.

In the electric double layer capacitor employing an organic electrolyte, a capacitor element is formed by rolling a pair of opposing electrodes interposing a separator therebetween wherein each of the electrodes comprises a metallic current collector foil on which a thin film polarization electrode composed mainly of activated carbon powder is attached. The capacitor element which is impregnated with an organic electrolyte is put in a bottomed cylindrical casing made of metal. The opening of the metallic casing is sealed with a sealing material such as a sealing rubber, gasket, a Bakelite plate lined with rubber or a lamination plate of phenol resin and rubber to prevent the electrolyte from evaporation. Further, there has recently been proposed to use a polymer electrolyte gel.

Besides of the electric double layer capacitor of so-called the electrode foil rolling type, Japanese Unexamined Patent Publication JP-A-4-154106 proposes an electric double layer capacitor of large current and capacity in which a lamination type capacitor element is installed, which is formed by stacking a large number of electrodes and separators in a flat plate shape. The proposed capacitor has a large capacitance and is durable to a large current.

The lamination type electric double layer capacitor is formed as follows. The capacitor element is formed by stacking a large number of rectangular polarization electrodes and rectangular separators wherein the separators are alternately inserted between the polarization electrodes. A positive electrode and a negative electrode are connected respectively with a lead wire for the positive electrode and a lead wire for the negative electrode at each end portion by crimping operations. The capacitor element with the lead wires is put in a bottomed polygonal tubular casing made of aluminum. An organic electrolyte is impregnated into the capacitor element. Then, the opening of the aluminum casing is sealed with a cover plate of aluminum.

For the electrodes, either of the positive electrode or the negative electrode for the electric double layer capacitor is composed mainly of activated carbon or polyacene having a large specific surface area. Recently, the electric double layer capacitor for power devices as a unit cell having an electrostatic capacitance of 10–10,000 F and a working voltage of 2.3–3 V has been developed. In a case of using the electric double layer capacitors for power devices, a plurality of, e.g., a 4 to 160 number of unit capacitors are connected in series by means of outer lead wires to obtain a predetermined power source voltage, such as d.c. 8 V to 380 V.

The electric double layer capacitor formed by connecting a plurality of unit capacitors in series had the problem as follows. When a voltage is applied to the electric double layer capacitor, the voltage was not uniformly applied to the unit capacitors due to a scatter in leakage current in the unit capacitors and a voltage beyond the working voltage is applied to some unit capacitors, with the result that there took place deterioration in the capacitors which invited the deterioration of the entire unit capacitors connected in series.

For example, when a voltage which is 0.15 V or more higher than the working voltage is applied to a unit capacitor for a long term, the deterioration of the capacitor is remarkable. Accordingly, it is necessary to determine the upper limit of a voltage applied to each unit capacitor in an assembled cell structure, specifically, it is necessary to determine the upper limit of voltage in a manner that 0.15 V, preferably 0.10 V is added to the working voltage.

Further, since the working voltage of the unit capacitor element in the electric double layer capacitor employing an aqueous solution type electrolyte is 0.8–1 V, a laminated capacitor having a rated voltage of 8–200 V is formed by stacking 10–200 unit elements. However, such lamination type capacitor also has a problem of scattering in voltage in the same manner as above mentioned.

In order to eliminate such problem, there has been known a method of connecting resistors each having the same resistance in parallel to the serially connected unit capacitors to thereby reduce a scattering in voltage in each of the serially connected unit capacitors (first conventional technique). Further, Japanese Unexamined Patent Publication JP-A-6-302474 proposes a method wherein in a lamination type electric double layer capacitor in which a plurality of unit capacitors are directly stacked without using an outer lead wire, a protective circuit comprising a serial connection of a Zener diode and a resistor is connected in parallel to each of the unit capacitors (second conventional technique).

However, in the first conventional technique wherein the resistor is connected in parallel to each of the unit capacitors, an amount of leakage current increases to 5–10 times due to the resistors connected in parallel whereby an amount of self-discharging becomes large, and the voltage holding characteristics is remarkably reduced.

In the second conventional technique wherein the Zener diode and the resistor are used, there was found a certain effect in an electric double layer capacitor employing an aqueous solution type electrolyte wherein the electrostatic capacitance of the element was small as about several farads. However, when the electrostatic capacitor of the unit element was large as several tens farads and the number of stacked unit elements was large as 10–300 layers, a scatter in voltage in the unit elements became large.

Further, in the electric double layer capacitor employing an organic type electrolyte wherein the capacitance was large as several tens farads or more, little effect could be expected in equalization of voltage, and further, it was difficult to assure a sealing function at the side surface of the stacked unit capacitors. Further, the working voltage of the capacitors was decreased due to permeation of water from the outside.

Description is made with reference to FIG. 5 showing the operational characteristic diagram of Zener diode. In the conventional technique, a Zener diode was used in a portion Eb where a current in the Zener diode rised. On the other hand, the inventors of this application have noted a portion where a current in the Zener diode sharply rises, and have extensively studied on a method capable of reducing a scattering in an applied voltage while occurrence of short circuit in an over voltage is suppressed. As a result, they have found to reduce substantially a scattering of applied voltage by combining a specified Zener diode characteristic with a capacitor characteristic. Further, they have succeeded to suppress a scattering of voltage by arranging Zener diodes and fuses while safety in a protective circuit is improved without deteriorating the voltage holding characteristics.

SUMMARY OF THE INVENTION

In accordance with the present invention, there is provided an electric double layer capacitor used as a unit capacitor for forming an assembled cell type power source device by connecting a plurality of capacitor elements in series, wherein each of the capacitor elements is formed by impregnating an electrolyte in at least one pair of polarization electrode sheets between which a separator is inserted, wherein the electric double layer capacitor comprises a protective circuit in which a Zener diode having an operation resistance of 10–150 $\Omega$ at the average operation voltage of the electric double layer capacitor are connected in parallel to each of the electric double layer capacitors.

Further, in accordance with the present invention, there is provided an electric double layer capacitor used as a unit capacitor for forming an assembled cell type power source device by connecting a plurality of capacitor elements through outer lead wires, wherein each of the capacitor elements is formed by impregnating an electrolyte in polarization electrode sheets which are stacked or roled by interposing a separator therebetween; the stacked or roled capacitor element is received in a bottomed cylindrical hermetic container and the opening of the hermetic container is closed with a sealing member provided with a positive electrode terminal and a negative electrode terminal, and wherein the electric double layer capacitor comprises a protective circuit in which a Zener diode having an operation resistance of 20–150 $\Omega$ at the average operation voltage of the electric double layer capacitor is connected between the positive electrode terminal and the negative electrode terminal.

Thus, the electric double layer capacitor of the present invention may be either of a single layer type comprising a pair of polarization electrode sheets which are opposed by interposing a separator therebetween or a roll type wherein a plurality of the single layer type capacitors which are stacked in a lamination form or a strip form are wound in a spiral form.

For Zener diodes, there is found a fair amount of scattering in the Zener resistance even in the same lot, which of course, depends on the types. In the measurement of the Zener resistance of Zener diodes of certain lots, the ratio of the minimum value to the maximum value was 2.5–5.

In choosing Zener diodes to be attached to the unit capacitors in the present invention, it is preferable that the ratio of the minimum value to the maximum value of the Zener resistance is 1.5 or less. When the ratio exceeds 1.5, an amount of scattering in voltage in each of the unit capacitors is large. In particular, it is preferable to use a ratio of 1.2 or less.

For the unit capacitor used for power devices, one having an electrostatic capacitance of 10 F or more can perform the effect of the present invention. An electrostatic capacitance of 30 F or more is especially preferable. Although the upper limit of the electrostatic capacitance is not determined, an electrostatic capacitance of 3,000–10,000 F is generally produced for tests.

In view of the above, it is preferable that when the electrostatic capacitance of an electric double layer capacitor is 30 F or more, the ratio of the insulation resistance of the electric double layer capacitor to the Zener resistance of a Zener diode at the average operation voltage of the capacitor is 3:1–1:4.

The protective circuit is composed basically of a Zener diode. However, it is desirable to connect a fuse in series to the Zener diode. In such case, it is preferable to form a one-piece body of a serial connection of the Zener diode and the fuse on an insulation plate of synthetic resin and to connect the one-piece body between the positive electrode terminal and the negative electrode terminal.

Further, according to the present invention, there is provided an assembled cell type power source device comprising a serial connection of a plurality of unit capacitor elements as unit capacitors wherein each of the unit capacitors is formed by impregnating an electrolyte in polarization electrode sheets between which a separator is inserted, wherein a plurality of capacitor blocks each including a predetermined number of unit capacitors and protective circuits each including a Zener diode for capacitor block, which has an operation resistance of 10–150 $\Omega$ at the rated voltage of the capacitor block wherein each of the protective circuits is connected in parallel to each of the capacitor blocks.

In the formation of the capacitor blocks, the number of the capacitors in each of the blocks is preferably 3–10. In a case of using two capacitors, the number of blocks is increased, and an amount of scattering in voltage in each of the blocks is apt to be large. Further, when the number exceeds 10, an amount of scattering in voltage in each of the unit capacitors in a block is apt to be large. Accordingly, a number of 4–8 is preferable.

The number of the unit capacitors in each of the blocks may be same or different. Further, when the insulation resistance value of the unit capacitors in capacitor blocks is equal to each other, the number of the unit capacitors in the capacitor blocks can be increased. However, when an amount of scattering in the insulation resistance values is large, the number of the unit capacitors should be reduced in order to reduce an amount of scattering in voltage.

Further, when the number of the unit capacitors to be connected in series is large, Zener diodes should be connected in parallel so as to bridge 3 to 10 blocks, if necessary, so that a voltage in each of the unit capacitors which constitutes an assembled cell type power source circuit can be equalized.

In the assembled cell type power source device, when the electrostatic capacitance of the unit capacitors is 30 F or more, it is desirable that the ratio of the insulation resistance of the capacitor block to the Zener resistance of the Zener diode at the rated voltage of a capacitor block is 3:1–1:4. Further, it preferable that the ratio of the minimum value to the maximum value of the Zener resistance of the Zener diode for capacitor block is 1.5 or less.

Further, the Zener diode having an operation resistance of 20–150 Ω at the average operation voltage of the unit capacitor can be connected in parallel to each of the unit capacitors in the capacitor blocks. In this case, it is preferable that the ratio of the operation resistance of the Zener diode for unit capacitor to the operation resistance of the Zener diode for capacitor block is 1:1.2–1:5. Further, it desirable to connect a fuse in series to each of the Zener diodes for capacitor block.

In the present invention, a plurality of unit capacitors can be connected in series by means of lead wires. Alternatively, a plurality of unit capacitors may be stacked directly as described in Japanese Unexamined Patent Publication JP-A-6-302474. In this case, it is desirable to connect the Zener diode in parallel to each of the capacitor blocks by using electric conductive plates such as terminals composed of a metallic plate, an electric conductive rubber sheet, a glassy carbon plate or the like, for each of the capacitor blocks.

In the present invention, the average operation voltage Eav of the electric double layer capacitor (unit capacitor) means the average voltage for each of the unit capacitors in a case that an n number of unit capacitors are connected in series to form an assembled cell structure in which the rated voltage V of the assembled cell is applied from the outside, namely, Eav=V/n. The average operation voltage Eav should be the rated voltage of the unit capacitor or a voltage lower than the rated voltage. The rated voltage Eb of the capacitor block is a voltage obtained by multiplying the rated voltage of the unit capacitor by the number of unit capacitors connected in series in the capacitor block.

In FIG. 5 showing the operation characteristics of the Zener diode, the operation resistance Z of the Zener diode means a resistance obtained by dividing a small change of voltage by a small change of current at the average operation voltage Eav of the unit capacitor or the rated voltage Eb of the capacitor block, i.e., $Z=\Delta Vz/\Delta Iz$. The formula is obtainable from a gradient of the tangent line at Eav or Eb.

The Zener resistance Rz is a resistance wherein a Zener current Iz flows in the Zener diode when the voltage of the Zener diode is the average operation voltage Eav or the rated voltage Eb, which is obtainable from Rz=Eav/Iz or Rz=Eb/Iz.

The insulation resistance value Rc of the unit capacitor can be obtained by a leakage current value when the rated voltage is continuously applied for 100 hours at 25° C. The rated voltage of the unit capacitor implys an allowable voltage wherein a rate of change in the electrostatic capacitance in a case that a d.c. voltage is continuously applied to the unit capacitor for 1,000 hours at 700° C., is within 30%.

Further, the insulation resistance value Rb of a capacitor block is obtainable from a leakage current value when the rated voltage is continuously applied to the capacitor block for 100 hours at 25° C.

As described above, for the Zener diode (the Zener diode for unit capacitor) to be connected to each of the unit capacitors, one having an operation resistance Z of 10–150 Ω, more preferably, 30–100 Ω at the average operation voltage Eav of the unit capacitor is preferably employable. When the operation resistance Z exceeds 150 Ω, voltage equalizing effect becomes insufficient. On the other hand, when the operation resistance Z is less than 10 Ω, there causes a scattering in the initial capacitance of the capacitor, and a large current beyond the allowable current value is apt to flow in the Zener diode of the protective circuit when there is fluctuation in the load. As a result, there occur problems such as the break-down of the Zener diode, the breakage of the fuse and so.

In the assembled cell type power source device in which the Zener diode (the Zener diode for capacitor blocks) is connected to each of the capacitor blocks, the Zener diode having an operation resistance Z of 10–150 Ω at the rated voltage of the capacitor block is employable. However, in order to control effectively an amount of scattering of voltage in all the unit capacitors, it is necessary to reduce a scattering of voltage between the capacitor blocks rather than the scattering of voltage in each of the capacitor blocks. In the present invention, accordingly, the ratio of the operation resistance of the Zener diode for capacitor block to the operation resistance of the Zener diode for unit capacitor block is determined to be 1:1.2–1:5. Specifically, it is preferable to use the Zener diode for capacitor block which has an operation resistance of 10–120 Ω which is smaller than the operation resistance of the Zener diode for unit capacitor. More preferably, the operation resistance is 15–70 Ω.

When the operation resistance Z of the Zener diode for capacitor block is less than 10 Ω, there causes a scattering in electrostatic capacitance at an early stage of the capacitor block and a large current is apt to flow in the protective circuit when there is fluctuation in the load. In this case, the resulting current exceeds the allowable current value of the Zener diode. Accordingly, problems such as the break-down of the Zener diode and the breakage of the fuse occur. When the operation resistance Z of the Zener diode for capacitor block exceeds 150 Ω, an amount of scattering in voltage between the capacitor blocks becomes large.

The Zener diode for unit capacitor wherein the ratio of the insulation resistance Rc of the unit capacitor to the Zener resistance Rz at the average operation voltage Eav of the unit capacitor in a case that the electrostatic capacitance of the unit capacitor is 30 F, is 3:1–1:4, preferably 2:1–1:3, is employed. When the Zener resistance Rz is beyond 3:1 in the above-mentioned ratio, an amount of scattering of voltage becomes large. On the other hand, when the ratio is less than 1:4, a leakage current in the circuit becomes large.

For the assembled cell type power source device, the Zener diode for capacitor block wherein the ratio of the insulation resistance Rb of the capacitor block to the Zener resistance Rz at the rated voltage Ev is 3:1–1:4, is employed. When the Zener resistance Rz is larger than the above-mentioned value, a scattering of voltage becomes large. On the other hand, when the ratio is smaller than the value, a leakage current of the circuit becomes large. Preferably, the ratio in a range of 2:1–1:3 is employed.

The break-down of the Zener diode sometimes occurs when an overvoltage is applied to the Zener diode connected to each of the unit capacitors or each of the capacitor blocks in an assembled cell type power source device. In order to prevent such disadvantage, it is preferable to connect a fuse in series to the Zener diode. A desirable fuse is such one having a low resistance value, for example, 10 Ω or less. When the resistance value of the fuse exceeds 10 Ω, a voltage balancing effect for the protective circuit is reduced. The fusing current value of the fuse is determined in consideration of the allowable current value of the Zener diode.

For the Zener diode for unit capacitor and the Zener diode for capacitor block, it is desirable to use Zener diodes of uniform characteristics. In particular, Zener diodes having uniform operation resistance Z and uniform Zener resistance Rz at the average operation voltage Eav of the unit capacitor or the rated voltage Eb of the capacitor block are used, wherein the Zener diodes are selected from those manufactured in the same lot. In consideration of the above, standard is determined in the selection of Zener diodes in the same lot in the present invention. Namely, the ratio of the minimum value to the maximum value of the Zener resistance is to be 1.5 or less.

The upper limit of the rated voltage of the assembled cell type power source device in which an n number of unit capacitors are connected in series, is preferably to be an n times of the rated voltage value of each of the unit capacitors. In the present invention, since the assembled cell power source device operable at a high voltage can be formed by using a smaller number of unit capacitors, it is in particular preferable to use, as unit capacitors, electric double layer capacitors of large capacitance in which an organic electrolyte is impregnated.

In the present invention, the rated voltage of each of the capacitor blocks is preferably to be 8–50 V. A voltage equalization effect is remarkable by forming a power source device having a rated voltage of 16–400 V by connecting these capacitor blocks in series. In particular, a substantial voltage equalization effect is obtainable by determining the rated voltage of the capacitor blocks to be 10–25 V. When the rated voltage of the capacitor blocks is lower than 8 V, the construction of the power source circuit becomes complicated. On the other hand, when the rated voltage exceeds 50 V, the voltage equalization effect can not be expected.

A power source device having a power source voltage of 20 V or more can be formed by connecting a 8 or more number of unit capacitors in series even when the electrostatic capacitance of the unit capacitors is 1–10 F. Even in this case, an amount of scattering of voltage of the unit capacitors can be suppressed. Such power source device is useful as a small-sized power source for electronic circuits.

Generally, a power source for power devices is required to have an elongated energy reserving effect. Accordingly, it is required for the power source circuit in which capacitors are connected in series, to have an efficient voltage reserving effect. In a conventional power source employing a voltage balancing circuit in which resistors are connected in parallel, there was a serial drawback that the voltage reserving effect was substantially reduced.

In use of the voltage balancing protective circuit of the present invention, the voltage reserving effect slightly reduces due to an small amount of leakage current in the vicinity of the rated voltage. However, as seen in FIG. 5, the Zener current sharply reduces in a region where the voltage reduces by 5–10% from the rated voltage whereby the leakage current is reduced in the assembled cell type power source device. As a result, substantially the same voltage reserving effect as in the capacitor itself can be obtained. Practically, a sufficient voltage reserving effect is obtainable.

In the present invention, an assembled cell structure formed by connecting a plurality of unit capacitors in series can reduce a scattering of voltage in each unit capacitor during the application of voltage for a long time or after charging/discharging cycles. In this case, it is preferable to suppress a scattering of capacitance in the capacitors to be within +/–10%, in particular, within +/–5% to prevent a scattering of initial voltage in each of the unit capacitors.

In a preferred embodiment of the polarization electrode used for the electric double layer capacitor of the present invention, it is formed by coating a carbon material having a high specific surface area on an electric collecting foil made of metal to form a sheet-like electrode. The sheet-like electrode and a separator are alternately stacked to form a stacked product. Or, the stacked product is rolled to form a rolled product. The stacked product or the rolled product is impregnated with an electrolyte, and is received in a hermetic container. The opening of the container is closed with a sealing member provided with a positive electrode terminal and a negative electrode terminal. Thus, a unit capacitor is formed. In this case, use of an organic electrolyte is preferable since it provides a higher energy density than an aqueous solution type electrolyte. In particular, a carbonate type solvent or a sulforane type solvent is desirable as solvent for the electrolyte because it is chemically and electrochemically stable, high in electric conductivity and excellent in low temperature characteristics. Further, a capacitor employing a polymer electrolyte will be effective in the present invention.

In the present invention, a remarkable effect is obtainable to equalize voltage in a case of connecting an electrochemical element in series wherein at least one electrode between the positive electrode and the negative electrode is a polarization electrode.

BRIEF DESCRIPTION OF THE SEVERAL VIEWS

DETAILED DESCRIPTION OF THE INVENTION

Preferred embodiments of the present invention will be described with reference to the drawings.

Figure 1:
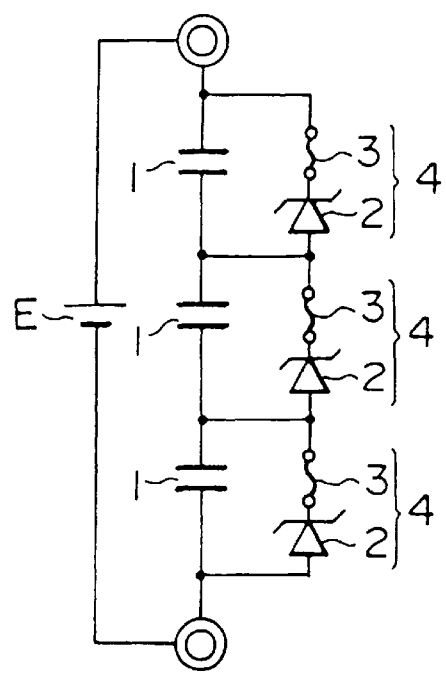
FIG. 1 is a circuit diagram showing an embodiment of the assembled cell structure of the present invention wherein three electric double layer capacitors each provided with a protective circuit are connected in series.

FIG. 1 shows an embodiment of an assembled cell type power source device of the present invention wherein the assembled cell type power source device is formed by connecting 3 unit capacitors in series by means of outer lead wires (not shown) in which each of the unit capacitors is composed of an electric double layer capacitor 1 which employs an organic electrolyte, and a d.c. power source E is connected to the assembled cell type power source device.

In FIG. 1, a protective circuit 4 comprising a serial connection of a Zener diode 2 and a fuse 3 is connected between the positive electrode terminal and the negative electrode terminal of each of the unit capacitors 1 (electric double layer capacitors). The Zener diode 2 has an operation resistance Z of 10–150 Ω at the average operation voltage Eav of the unit capacitor 1 as described before.

When the electrostatic capacitance of the unit capacitors 1 is 30 F or more, the ratio of the insulation resistance Rc of the unit capacitors 1 to the Zener resistance Rz of the Zener diode 2 at the average operation voltage Eav should be 3:1–1:4.

In this embodiment, the fuse 3 is to prevent the breakdown of the Zener diode 2 due to an overvoltage. The resistance value of the fuse is preferably determined to be 10 Ω or less, for instance, so as not to reduce the voltage balancing effect by the protective circuit 4. The fusing current value of the fuse is determined in consideration of the allowable current value of the Zener diode.

The basic structure of the electric double layer unit capacitor 1 of the present invention may be a single-layered structure, a rectangular structure or a cylindrical structure in which a pair of polarization electrode sheets are disposed in an opposing relation between which a separator is inserted. In any of these structures, it is preferable that the positive electrode terminal and the negative electrode terminal are arranged in the same plane in order to connect effectively the protective circuits 4 to the unit capacitors which are connected in series.

Figure 2:
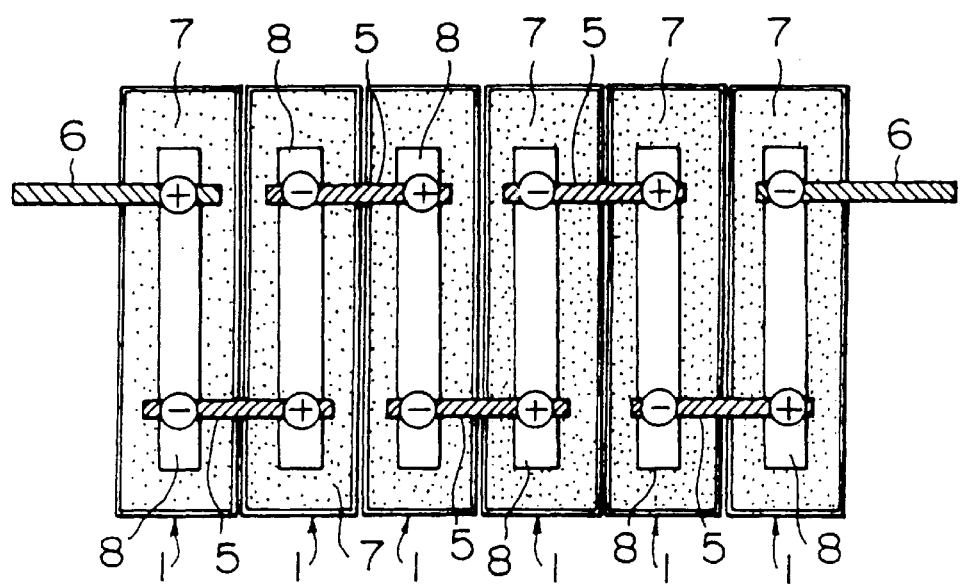
FIG. 2 is a plane view of an embodiment of the assembled cell structure of the present invention wherein 6 electric double layer capacitors each having a rectangular configuration and provided with a protective circuit are connected in series.

FIG. 2 shows an embodiment of the assembled cell type power source device in which 6 unit capacitors 1 having a rectangular structure are connected in series by means of outer lead wires 5. The unit capacitors 1 disposed at both ends are connected with power source lead wires 6 connected to a d.c. charging power source E.

FIG. 2 is a view from the top of the device, and the inside structure is not shown. Each of the unit capacitors 1 having a rectangular structure is formed as follows. A polarization electrode sheet and a separator formed in a rectangular shape respectively are alternately stacked to form a capacitor element. A positive electrode lead and a negative electrode lead are connected respectively end portions of the positive electrode and the negative electrode of the capacitor element by means of crimping. The capacitor element with positive and negative electrode leads is put in a bottomed rectangular casing made of a material such as aluminum. An organic electrolyte is impregnated into the capacitor element, and then, the opening of the casing is sealed with a cover plate 7.

In the unit capacitors 1 having rectangular structure, the opening of the rectangular casing is sealed with the cover plate 7 of a material such as aluminum whose shape is the same as the opening. The cover plate 7 is provided with the positive electrode terminal and the negative electrode terminal which penetrate the cover plate 7 by interposing an electric insulating resin or the like, and the positive and negative electrode terminals are respective connected to the positive lead and the negative lead extended from the capacitor element in the casing. In FIG. 2, the positive electrode terminal and the negative electrode terminal are respective indicated by symbols "+" and "−". Generally, these terminals are provided with nuts for fixing the outer lead wires 5.

In the present invention, the protective circuit 4 is connected between the positive electrode terminal "+" and the negative electrode terminal "−" provided on the cover plate 7. In this case, it is preferable to form a one-piece body of a serial connection of the Zener diode 2 and the fuse 3 fixed onto an insulating plate 8. With this, an efficient assembling operation for the protective circuit is obtainable by connecting the protective circuit 4 between the positive and negative electrode terminals by only fastening operations of nuts. Further, the one-piece body prevents the Zener diode 2 and the fuse 3 from swinging due to vibrations or an outer stress applied thereto and prevents an unexpected breaking or the contact of the Zener diode 2 or the fuse 3 to the outer lead wire 5 or another activated part.

Figure 3:
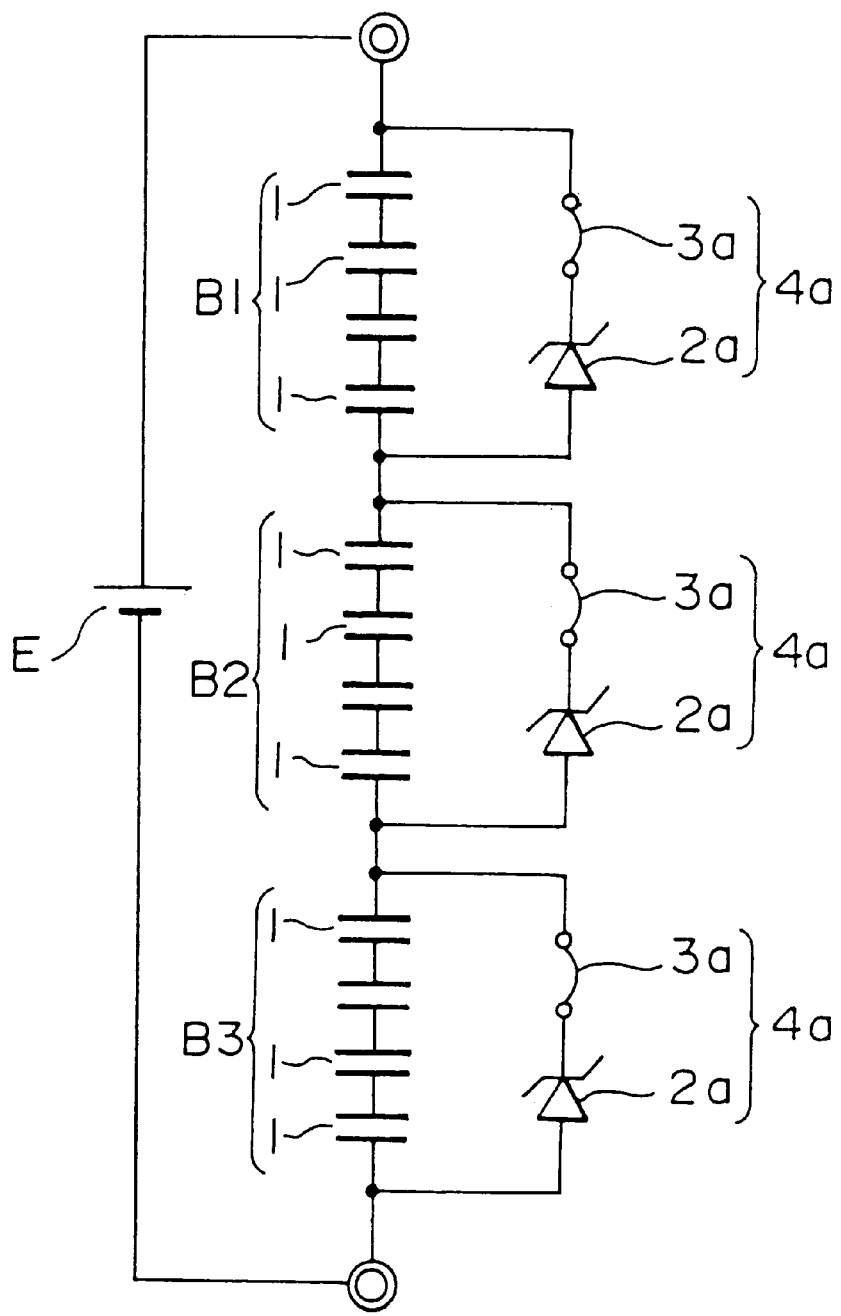
FIG. 3 is a circuit diagram showing another embodiment of the assembled cell type power source device with protective circuits.

FIG. 3 shows another embodiment of the assembled cell type power source device of the present invention in which 12 unit capacitors 1 are connected in series. In more detail, the 12 unit capacitors 1 are divided into 3 capacitor blocks B1–B3 each of which is constituted by 4 units capacitors 1, and a protective circuit 4a is connected in parallel to each of the capacitor blocks B1–B3.

In this embodiment, each of the protective circuits 4a comprises a Zener diode 2a and a fuse 3a connected in series wherein the operation resistance Z of the Zener diode 2a is 10–150 Ω at the rated voltage Eb of the capacitor block B. The fuse 3a having a resistance value of 10 Ω or less is used in order not to impair the voltage balancing effect of the protective circuits 4a.

When the electrostatic capacitance of each of the unit capacitors 1 is 30 F or more, the ratio of the insulation resistance Rb of the capacitor block B to the Zener resistance Rz of the Zener diode at the rated voltage Eb of the capacitor block B should be 3:1–1:4.

Figure 4:
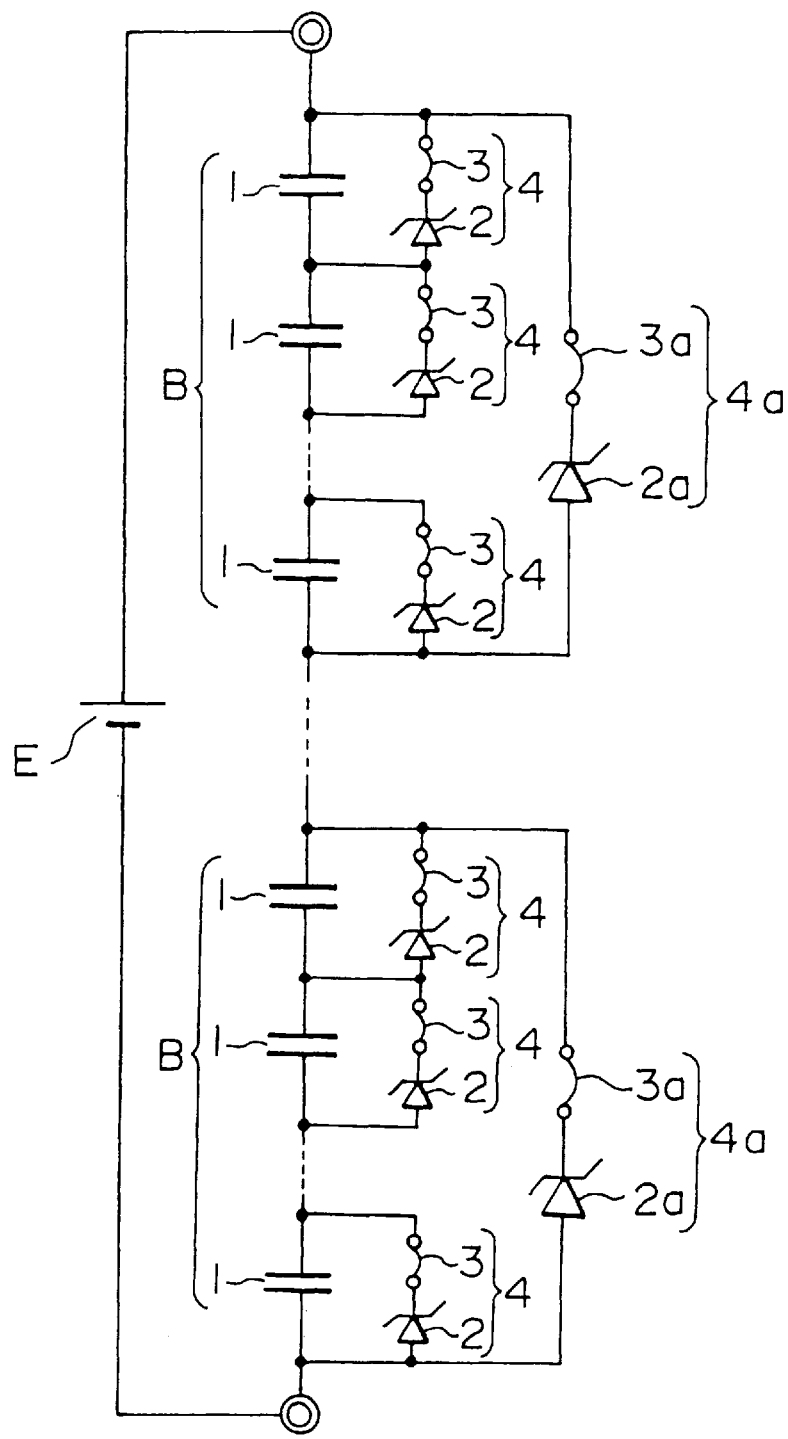
FIG. 4 is a circuit diagram showing another embodiment of the assembled cell type power source device with protective circuits.
Figure 5:
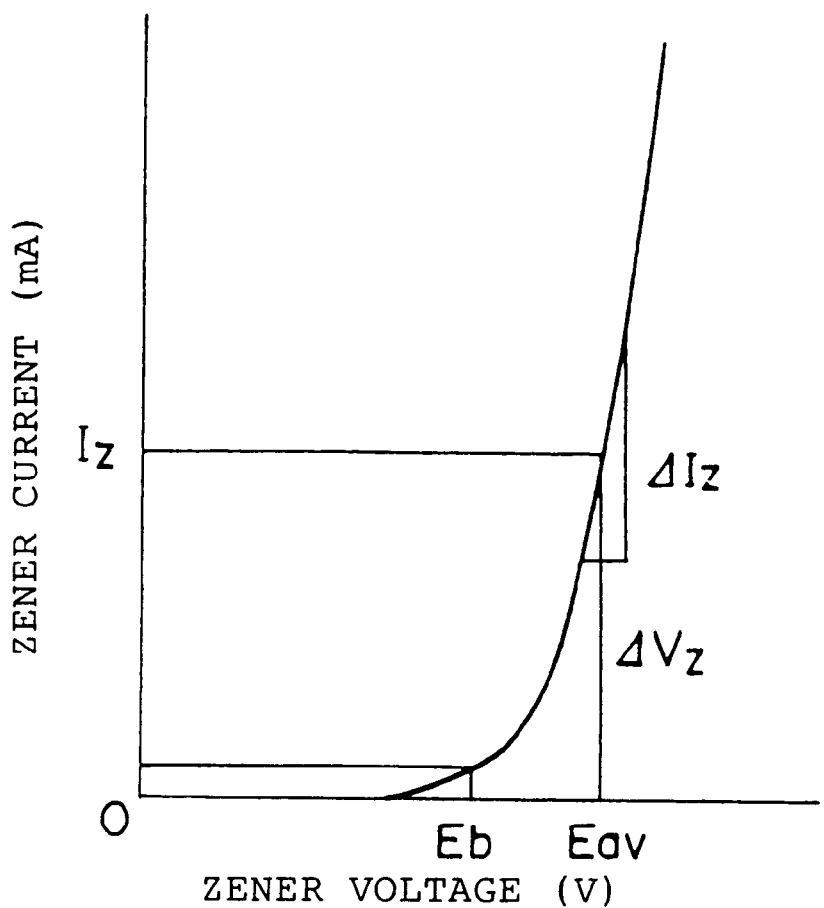
FIG. 5 is a characteristic diagram of a Zener diode.

FIG. 4 shows another embodiment of the assembled cell type power source device. In this embodiment, a plurality of unit capacitors 1 are divided into a plurality of capacitor blocks B. A protective circuit 4a is connected in parallel to each of the capacitor blocks B. Further, a protective circuit 4 is connected in parallel to each of the unit capacitors 1 in each of the capacitor blocks B. The protective circuit 4 may be the same as that shown in FIG. 1. Namely, the operation resistance Z of the Zener diode at the average operation voltage Eav of the unit capacitors 1 is 10–150 Ω.

Now, the present invention will be described in detail with reference to Examples. However, it should be understood that the present invention is by no means restricted by such specific Examples.

EXAMPLE 1

4 Unit capacitors of rectangular shape (organic electrolyte type electric double layer capacitors having an electrostatic capacitance of 1,300 F and a rated voltage of 2.5 V and having dimensions of 15 cm high, 7 cm wide and 2.2 cm thick) in which the insulation resistances Rc were respectively 930 Ω, 810 Ω, 400 Ω, and 340 Ω, were connected in series to thereby forming an assembled cell type power source having a rated voltage of 10 V. A Zener diode having an operation resistance Z of 63 Ω at an Eav (average operation voltage) of 2.5 V and a Zener resistance Rz of 320 Ω in average at the same Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the capacitors, an amount of scattering of voltage was 2.42–2.57 V. Further, after 100 hours, there was found no change in the amount of scattering of voltage. The ratio of the Zener resistance to the smallest insulation resistance value was 1.06:1. The ratio of the minimum value to the maximum value of the Zener resistance was 1.04:1. The resistance of the fuse was 2.5 Ω.

EXAMPLE 2

4 Unit capacitors were connected in series to form an assembled cell type power source having a rated voltage of 10 V in the same manner as in Example 1. A Zener diode having an operation resistance Z of 64 Ω at an Eav of 2.5 V and a Zener resistance Rz of 900 Ω in average at the same Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering of voltage was 2.40–2.58 V. Further, after 100 hours, there was found no change in the amount of scattering of voltage. The ratio of the Zener resistance to the smallest insulation resistance value was 1:2.6. The ratio of the minimum value to the maximum value of the Zener resistance was 1.03:1.

EXAMPLE 3

4 Unit capacitors having the same rectangular structure as in Example 1 in which the insulation resistances Rc are respectively 960 Ω, 470 Ω, 330 Ω and 210 Ω were connected in series to thereby form an assembled cell type power source having a rated voltage of 10 V. A Zener diode having an operation resistance Z of 63 Ω at an Eav of 2.5 V and a Zener resistance Rz of 320 Ω in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering of voltage was 2.35–2.60 V. Further, after 100 hours, there was found no change in the amount of scattering of voltage. The ratio of the Zener resistance to the smallest insulation resistance value was 1:1.5. The ratio of the minimum value to the maximum value of the Zener resistance was 1.04:1.

EXAMPLE 4

4 Unit capacitors having the same rectangular structure as in Example 1 in which the insulation resistances Rc are respectively 12,000 Ω, 11,000 Ω, 2,800 Ω and 960 Ω were connected in series to thereby form an assembled cell type power source having a rated voltage of 10 V. A Zener diode having an operation resistance Z of 63 Ω at an Eav of 2.5 V and a Zener resistance Rz of 900 Ω in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering of voltage was 2.41–2.55 V. After 100 hours, there was found no change in the amount of scattering of voltage. The ratio of the Zener resistance to the smallest insulation resistance value was 1.06:1. The ratio of the minimum value to the maximum value of the Zener resistance was 1.03:1.

EXAMPLE 5

4 Unit capacitors having a cylindrical structure (organic electrolyte type electric double layer capacitors having an electrostatic capacitance of 800 F and a rated voltage of 2.5 V and having dimensions of 5 cm in diameter and 12 cm high) in which the insulation resistances Rc are respectively 650 Ω, 500 Ω, 400 Ω and 300 Ω, were connected in series to thereby form an assembled cell type power source having a rated voltage of 10 V. A Zener diode having an operation resistance Z of 63 Ω at an Eav of 2.5 V and a Zener resistance Rz of 320 Ω in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering was 2.42–2.53 V. Further, after 100 hours, there is found no change in the amount of scattering of voltage. The ratio of the Zener resistance to the smallest insulation resistance value was 1:1.06. The ratio of the minimum value to the maximum value of the Zener resistance was 1.04:1.

EXAMPLE 6

4 Unit capacitors having the same structure as in Example 1 were connected in series to thereby form an assembled cell type power source having a rated voltage of 10 V. A Zener diode having an operation resistance Z of 135 Ω at an Eav of 2.5 V and a Zener resistance Rz of 900 Ω in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering of voltage was 2.35–2.65 V. Further, after 100 hours, there was found no change in the amount of scattering of voltage. The ratio of the Zener resistance to the smallest insulation resistance value was 1:2.6. The ratio of the minimum value to the maximum value of the Zener resistance was 1.04:1.

EXAMPLE 7

4 Unit capacitors having the same structure as in Example 1 were connected in series to thereby form an assembled cell type power source having a rated voltage of 10 V. A Zener diode having an operation resistance Z of 63 Ω at an Eav of 2.5 V and a Zener resistance Rz of 480 Ω in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering of voltage was 2.34–2.63 V. Further, after 100 hours, there was found no change in the amount of scattering of voltage. The ratio of the Zener resistance to the smallest insulation resistance value was 1.06:1. The ratio of the minimum value to the maximum value of the Zener resistance was 2.23:1.

EXAMPLE 8

4 Unit capacitors having the same structure as in Example 1 were connected in series to thereby form an assembled cell type power source having a rated voltage of 10 V. A Zener diode having an operation resistance Z of 63 Ω at an Eav of 2.5 V and a Zener resistance Rz of 600 Ω in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering of voltage was 2.40–2.61 V. Further, after 100 hours, there was found no change in the amount of scattering of voltage. The ratio of the Zener resistance to the smallest insulation resistance value was 1.06:1. The ratio of the minimum value to the maximum value of the Zener resistance was 1.2:1.

COMPARATIVE EXAMPLE 1

4 Unit capacitors having the same structure as in Example 1 were connected in series to thereby form an assembled cell type power source having a rated voltage of 10 V. Without connecting the protective circuit composed of the Zener diode and the fuse to each of the unit capacitors, the assembled device was charged by applying a voltage of 10.00 V at room temperature for 100 hours. In the measurement of the voltage of each of the unit capacitors, an amount of scattering was 2.19–2.75 V. Further, after 100 hours, the amount of scattering of voltage was increased.

COMPARATIVE EXAMPLE 2

4 Unit capacitors having the same structure as in Example 3 were connected in series to thereby form an assembled cell type power source having a rated voltage of 10 V. Without connecting the protective circuit composed of the Zener diode and the fuse to each of the unit capacitors, the assembled device was charged by applying a voltage of 10.00 V at room temperature for 100 hours. In the measurement of the voltage of each of the unit capacitors, an amount of scattering was 2.03–2.90 V. Further, after 100 hours, the scattering of voltage was increased.

COMPARATIVE EXAMPLE 3

4 Unit capacitors having the same structure as in Example 4 were connected in series to thereby form an assembled cell type power source having a rated voltage of 10 V. Without connecting the protective circuit composed of the Zener diode and the fuse to each of the unit capacitors, the assembled device was charged by applying a voltage of 10.00 V at room temperature for 100 hours. In the measurement of the voltage of each of the unit capacitors, an amount of scattering of voltage was 2.20–2.70 V. Further, after 100 hours, the scattering of voltage was increased.

COMPARATIVE EXAMPLE 4

4 Unit capacitors having the same structure as in Example 1 were connected in series to thereby form an assembled cell type power source having a rated voltage of 10 V. A Zener diode having an operation resistance Z of 225 $\Omega$ at an Eav of 2.5 V and a Zener resistance Rz of 1,600 $\Omega$ in average at the Eav of 2.5 V and a fuse of 0.2 A were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering was 2.26–2.71 V. The ratio of the Zener resistance to the smallest insulation resistance value was 1:4.7. After 100 hours, the scattering of voltage was increased. The ratio of the minimum value to the maximum value of the Zener resistance was 1.04:1.

COMPARATIVE EXAMPLE 5

4 Unit capacitors having the same structure as in Example 1 were connected in series to thereby form an assembled cell type power source having a rated voltage of 10 V. A Zener diode having an operation resistance z of 64 $\Omega$ at an Eav of 2.5 V and a Zener resistance Rz of 900 $\Omega$ in average at the Eav of 2.5 V and a resistor of 10.00 $\Omega$ were connected in series between the positive electrode terminal and the negative electrode terminal of each of the unit capacitors. The assembled device was charged by applying a voltage of 10.00 V at room temperature for 100 hours. In the measurement of the voltage of each of the unit capacitors, an amount of scattering was 2.19–2.75 V. The ratio of the Zener resistance to the smallest insulation resistance value was 1:2.6. After 100 hours, the scattering of voltage was increased. The ratio of the minimum value to the maximum value of the Zener resistance was 1.04:1.

COMPARATIVE EXAMPLE 6

4 Unit capacitors having the same structure as in Example 2 were connected in series to thereby form an assembled cell type power source having a rated voltage of 10 V. A Zener diode having an operation resistance Z of 64 $\Omega$ at an Eav of 2.5 V and a Zener resistance Rz of 900 $\Omega$ in average at the Eav of 2.5 V and a resistor of 90 $\Omega$ were connected in series between the positive electrode terminal and the negative electrode terminal of each of the unit capacitors. The assembled device was charged by applying a voltage of 10.00 V at room temperature for 100 hours. In the measurement of the voltage of each of the capacitors, an amount of scattering was 2.28–2.70 V. The ratio of the Zener resistance to the smallest insulation resistance value was 1:2.6. After 100 hours, the scattering of voltage was increased. The ratio of the minimum value to the maximum value of the Zener resistance was 1.04:1.

EXAMPLE 9

16 Unit capacitors having a rectangular structure, each having an insulation resistance Rc of 11,000 $\Omega$–190 $\Omega$, a rated voltage of 2.5 V and an electrostatic capacitance of 1,300 F were connected in series to thereby form an assembled cell type power source device. An amount of scattering of the voltage of each of the unit capacitors was within +/−3.4%. Thus, an assembled cell type power source device having a rated voltage of 40 V was formed by connecting 4 capacitor blocks each having a rated voltage Eb of 10 V in series wherein each of the blocks was formed by connecting 4 unit capacitors in series. As the Zener diode for unit capacitors, a Zener diode having an operation resistance Z of 63 $\Omega$ at an Eav of 2.5 V and a Zener resistance Rz of 370 $\Omega$ in average at the Eav of 2.5 V and a fuse of 0.2 A were connected in series between the positive electrode terminal and the negative electrode terminal of each of the unit capacitors. The insulation resistors Rb of each of the capacitor blocks in the state that the Zener diode and the fuse were connected to the unit capacitors was 1,070 $\Omega$–590 $\Omega$.

A serial circuit comprising a Zener diode for the capacitor blocks, having an operation resistance Z of 20 $\Omega$ at the rated voltage Eb of the capacitor block of 10 V and a Zener resistance Rz of 670 $\Omega$ in average at the same Eb of 10 V and a fuse of 0.2 A were connected in parallel to each of the capacitor blocks.

The assembled cell type power source device was charged by applying a voltage of 40 V at room temperature for 100 hours. In the measurement of the voltage, an amount of scattering of the voltage of the 16 unit capacitors was 2.39–2.57 V. After 100 hours, there was found no change in the amount of scattering of voltage. The resistance of the fuse was 2.5 $\Omega$. The ratio of the Zener resistance of the capacitor blocks to the smallest insulation resistance value of the capacitor blocks was 1:1.4. The ratio of the minimum value to the maximum value of the Zener diode for the units capacitors, which was connected in parallel to the unit capacitors in the capacitor blocks was 1.3:1. Further, the ratio of the minimum value to the maximum value of the Zener diode for the capacitor blocks, which was connected in parallel to each of the capacitor blocks was 1.04:1.

EXAMPLE 10

16 Unit capacitors having a rectangular structure each having an insulation resistance Rc of 11,000 Ω–190 Ω, a rated voltage of 2.5 V and an electrostatic capacitance of 1,300 F were connected in series to thereby form an assembled cell type power source device in the same manner as Example 9. Namely, an assembled cell type power source device having a rated voltage of 40 V was formed by connecting 4 capacitor blocks each having a rated voltage Eb of 10 V in series wherein each of the capacitor blocks was formed by connecting 4 unit capacitors in series.

A Zener diode for the unit capacitors having an operation resistance Z of 63 Ω at an Eav of 2.5 V and a Zener resistance of 370 Ω in average at the Eav of 2.5 V and a fuse of 0.2 A were connected in series between the positive electrode terminal and the negative electrode terminal of each of the unit capacitors. The ratio of the minimum value to the maximum value of the Zener diode for the unit capacitors, which was connected in parallel to the unit capacitors in each of the capacitor blocks was 1.3;1.

Without connecting a serial circuit composed of a Zener diode and a fuse in parallel to each of the capacitor blocks, the assembled cell type power source device was charged by applying a voltage of 40 V at room temperature for 100 hours. In the measurement of the voltage of the unit capacitors, an amount of scattering of the voltage of the 16 unit capacitors was 2.21–2.67 V. After 100 hours, there was found no change of the amount of scattering of voltage.

COMPARATIVE EXAMPLE 7

16 Unit capacitors having a rectangular structure each having an insulation resistance Rc of 11,000 Ω–190 Ω, a rated voltage of 2.5 V and an electrostatic capacitance of 1,300 F were connected in series to thereby form an assembled cell type power source device in the same manner as Example 9. Thus, an assembled cell type power source device having a rated voltage of 40 V was formed by connecting 4 capacitor blocks each having a rated voltage Eb of 10 V in series wherein each of the capacitor blocks was formed by connecting 4 unit capacitors in series.

A serial circuit comprising a Zener diode, as a Zener diode for unit capacitor, having an operation resistance Z of 63 Ω at an Eav of 2.5 V and a Zener resistance of 370 Ω in average at the Eav of 2.5 V and a resistor having a resistance of 90 Ω was connected in parallel between the positive electrode terminal and the negative electrode terminal of each of the unit capacitors. The ratio of the minimum value to the maximum value of the Zener diode for the unit capacitors, which was connected in parallel to the unit capacitors in each of the capacitor blocks was 1.3:1.

Without connecting a serial circuit composed of a Zener diode and a fuse in parallel to each of the capacitor blocks, the assembled cell type power source device was charged by applying a voltage of 40 V at room temperature for 19 hours. In the measurement of the voltage of the 16 unit capacitors, an amount of scattering of the voltage was 2.15–2.78 V. After 19 hours, the scattering of the voltage was further increased.

As described above, according to the present invention, an amount of scattering of the voltage of the unit electric double layer capacitors or the capacitor blocks in an assembled cell structure formed by connecting a plurality of unit electric double layer capacitors in series can effectively suppressed when the assembled cell structure is charged. Further, an increase of a current flowing in the protective circuit can be prevented unlike a conventional technique wherein a protective resistor is connected in parallel to the unit capacitors. Accordingly, an excellent voltage holding effect can be obtained, and there is little possibility of causing a short circuit in the circuits of the assembled structure even when any of the unit electric double layer capacitors becomes fault.

Further, it is easy to connect the protective circuit between the positive and negative electrode terminals of the unit electric double layer capacitors by forming the protective circuit in a one-piece body comprising a serial connection of a Zener diode and a fuse on an insulation plate. Further, the insulation plate functions as an insulation member for a cover plate provided with the positive and negative electrode terminals when the cover plate is made of metal. Further, the number of constituting parts and labor in the assembling work can be reduced.

What is claimed is:

1. An electric double layer capacitor used as a unit capacitor for forming an assembled cell type power source device, comprising:

a plurality of capacitor elements connected in series, and a protective circuit in which a Zener diode having an operation resistance of 10–150 Ω at an average operation voltage of the electric double layer capacitor is connected in parallel to each of the capacitor elements.

2. An electric double layer capacitor according to claim 1, wherein the ratio of the minimum value of Zener resistance of the Zener diode to the maximum value of Zener resistance of the Zener diode is 1.5 or less.

3. An electric double layer capacitor according to claim 1, wherein the electrostatic capacitance of the electric double layer capacitor is 30 farads or more, and the ratio of the insulation resistance of the electric double layer capacitor to the Zener resistance of the Zener diode at the average operation voltage of the electric double layer capacitor is 3:1–1:4.

4. An electric double layer capacitor according to claim 1, wherein said protective circuit consists of said Zener diode connected in series with a low-resistance fuse.

5. An electric double layer capacitor according to claim 1, wherein a fuse is connected in series to the Zener diode in the protective circuit.

6. An electric double layer capacitor according to claim 5, wherein the resistance of the fuse is 10 Ω or less.

7. An electric double layer capacitor used as a unit capacitor for forming an assembled cell type power source device comprising:

a plurality of capacitor elements connected through outer lead wires, wherein each of the capacitor elements is received in a sealed container and an opening of the sealed container is closed with a sealing member provided with a positive electrode terminal and a negative electrode terminal, and a protective circuit in which a Zener diode having an operation resistance of 20–150 Ω at the average operation voltage of the electric double layer capacitor is connected between the positive electrode terminal and the negative electrode terminal.

8. An electric double layer capacitor according to claim 7, wherein a fuse is connected in series to the Zener diode on an insulating board of synthetic resin in a one-piece state, and a serial connection of the fuse and the Zener diode is interposed between the positive electrode terminal and the negative electrode terminal.

9. An electric double layer capacitor according to claim 7, wherein said protective circuit consists of said Zener diode connected in series with a low-resistance fuse.

10. An assembled cell type power source device having a serial connection of a plurality of unit capacitor elements comprising:

a plurality of capacitor blocks each including a predetermined number of unit capacitors and protective circuits each including a Zener diode for a capacitor block, said diode having an operation resistance of 10–150 Ω at the rated voltage of the capacitor block, wherein each of the protective circuits is connected in parallel to each of the capacitor blocks.

11. An assembled cell type power source device according to claim 10, wherein the ratio of the minimum value of Zener resistance of the Zener diode for the capacitor block to the maximum value of Zener resistance of the Zener diode for the capacitor block is 1.5 or less.

12. An assembled cell type power source device according to claim 10, wherein the electrostatic capacitance of the unit capacitor is 30 farads or more, and the ratio of the insulation resistance of the capacitor block to the Zener resistance of the Zener diode for capacitor block at the rated voltage of the capacitor block is 3:1–1:4.

13. An assembled cell type power source device according to claim 10, wherein the rated voltage of the capacitor blocks is 8–50 V.

14. An assembled cell type power source device according to claim 10, wherein a fuse is connected in series to the Zener diode for capacitor block.

15. An electric double layer capacitor according to claim 10, wherein said protective circuit consists of said Zener diode connected in series with a low-resistance fuse.

16. An assembled cell type power source device according to claim 10, wherein a protective circuit including a Zener diode having an operation resistance of 20–150 Ω at the average operation voltage of the unit capacitor is connected in parallel to each of the unit capacitors in each of the capacitor blocks.

17. An assembled cell type power source device according to claim 16, wherein the ratio of the operation resistance of the Zener diode for unit capacitor to the operation resistance of the Zener diode for capacitor block is 1:1.2–1:5.

* * * * *